(12) United States Patent
Wu et al.

(10) Patent No.: US 11,328,634 B1
(45) Date of Patent: May 10, 2022

(54) PROJECTION DEVICE AND METHOD WITH LIQUID CRYSTAL ON SILICON PANEL

(71) Applicant: Himax Display, Inc., Tainan (TW)

(72) Inventors: Biing-Seng Wu, Tainan (TW); Chi-Wen Lin, Tainan (TW); Kuan-Hsu Fan Chiang, Tainan (TW)

(73) Assignee: Himax Display, Inc., Tainan (TW)

(*) Notice: Subject to any disclaimer, the term of this patent is extended or adjusted under 35 U.S.C. 154(b) by 0 days.

(21) Appl. No.: 17/446,987

(22) Filed: Sep. 7, 2021

(51) Int. Cl.
| | | |
|---|---|---|
| *G09G 3/36* | (2006.01) | |
| *G09G 3/00* | (2006.01) | |
| *G02B 27/48* | (2006.01) | |
| *G03H 1/22* | (2006.01) | |

(52) U.S. Cl.
CPC ............. *G09G 3/003* (2013.01); *G02B 27/48* (2013.01); *G03H 1/2294* (2013.01); *G09G 3/36* (2013.01); *G03H 2226/02* (2013.01); *G09G 2320/0233* (2013.01)

(58) Field of Classification Search
CPC .... G11C 19/184; G11C 19/28; G09G 3/2092; G09G 2330/021; G09G 5/00; G09G 3/36; G09G 3/30; G09G 3/003; G09G 2320/0233; G09G 3/34; G06F 3/038; G03H 1/2294; G03H 2226/02; G02B 27/48
See application file for complete search history.

(56) References Cited

U.S. PATENT DOCUMENTS

| | | | | |
|---|---|---|---|---|
| 2008/0007808 | A1* | 1/2008 | Ogasawara | .......... G11B 7/0065 |
| 2012/0188619 | A1* | 7/2012 | Song | .................... G03H 1/2294 |
| | | | | 359/9 |
| 2021/0223738 | A1* | 7/2021 | Futterer | ................. G03H 1/268 |
| 2021/0264628 | A1* | 8/2021 | Yoon | ....................... G06F 17/14 |
| 2021/0293714 | A1* | 9/2021 | Matoba | ................ G03H 1/0005 |

* cited by examiner

*Primary Examiner* — Pegeman Karimi
(74) *Attorney, Agent, or Firm* — CKC & Partners Co., LLC

(57) ABSTRACT

The projection device includes a light source, a liquid crystal on silicon (LCoS) panel, and a circuit. The circuit is configured to obtain a target image including a target pattern, and generate two content images. Each content image includes a duplicated pattern of the target pattern, and the duplicated patterns are off-axis shifted to the same coordinate when performing a computer-generated hologram (CGH) algorithm, so as to generate a phase image. The LCoS panel is driven according to the phase image to display a reconstructive image at a reconstructive distance.

12 Claims, 6 Drawing Sheets

PROJECTION DEVICE AND METHOD WITH LIQUID CRYSTAL ON SILICON PANEL

BACKGROUND

Field of Invention

The present invention relates to a projection device including a liquid crystal on silicon (LCoS) panel and capable of reducing speckles noises.

Description of Related Art

Liquid Crystal on Silicon (LCoS) display is a miniaturized reflective active-matrix liquid-crystal display or microdisplay using a liquid crystal layer on top of a silicon backplane. LCoS display was initially developed for projection televisions but is now used for wavelength selective switching, structured illumination, near-eye displays and optical pulse shaping. For the holographic display using LCoS, it uses light diffraction to form images. The formation of diffraction images is the reconstruction of constructive and destructive interference. The LCoS display includes multiple pixels. When a laser beam incidents on LCoS, each pixel can change a phase of the laser beam, the diffraction image is reconstructed at a certain distance. Speckles result from these patterns of constructive and destructive interference and present bright and dark dots in the target image to be displayed. It is an issue in the art about how to reduce the speckles.

SUMMARY

Embodiments of the present disclosure provide a projection device including a light source, a liquid crystal on silicon (LCoS) panel, and a circuit. The light source is configured to provide a light beam. The circuit is configured to obtain a target image including a first target pattern, and generate a first content image and a second content image according to the target image. The first content image includes a first duplicated pattern of the first target pattern, the second content image includes a second duplicated pattern of the first target pattern, and a coordinate of the first duplicated pattern is different from a coordinate of the second duplicated pattern. The circuit is configured to set a first off-axis shift of the first duplicated pattern and a second off-axis shift of the second duplicated pattern, such that a shifted coordinate of the first duplicated pattern is identical to a shifted coordinate of the second duplicated pattern. The circuit is configured to perform a computer-generated hologram (CGH) algorithm according to the first content image, the first off-axis shift, the second content image, the second off-axis shift, a wavelength of the light beam, and a first reconstructive distance to generate a phase image. The liquid crystal on silicon panel is configured to receive the light beam, and the circuit is configured to drive the liquid crystal on silicon panel according to the phase image to display a first reconstructive image at the first reconstructive distance.

In some embodiments, the first off-axis shift is in a first direction, and the circuit is configured to progressively increase an intensity of the first duplicated pattern along the first direction.

In some embodiments, the second off-axis shift is in a second direction, the circuit is configured to progressively increase an intensity of the second duplicated pattern along the second direction.

In some embodiments, the target pattern is at a first coordinate in a range corresponding to the liquid crystal on silicon panel. The circuit is configured to set the first off-axis shift, such that the shifted coordinate of the first duplicated pattern is different from the first coordinate and outside the range corresponding to the liquid crystal on silicon panel.

In some embodiments, the liquid crystal on silicon panel includes multiple pixels, and the circuit is configured to determine an upper limit of the first off-axis shift according to the first reconstructive distance, the wavelength and a size of the pixels.

In some embodiments, the target image further includes a second target pattern. The circuit is configured to generate a third content image and a fourth content image according to the target image. The third content image includes a third duplicated pattern of the second target pattern. The fourth content image includes a fourth duplicated pattern of the second target pattern. A coordinate of the third duplicated pattern is different from a coordinate of the fourth duplicated pattern. The circuit is configured to set a third off-axis shift of the third duplicated pattern and a fourth off-axis shift of the fourth duplicated pattern, such that a shifted coordinate of the third duplicated pattern is identical to a shifted coordinate of the fourth duplicated pattern. The circuit is further configured to perform the CGH algorithm according to a second reconstructive distance, such that the liquid crystal on silicon panel displays a second reconstructive image corresponding to the second target pattern at the second reconstructive distance.

From another aspect, embodiments of the present disclosure provide a projection method for a liquid crystal on silicon panel. The projection method includes: obtaining a target image and generating a first content image and a second content image according to the target image, in which the target image includes a first target pattern, the first content image includes a first duplicated pattern of the first target pattern, the second content image includes a second duplicated pattern of the first target pattern, and a coordinate of the first duplicated pattern is different from a coordinate of the second duplicated pattern; setting a first off-axis shift of the first duplicated pattern and a second off-axis shift of the second duplicated pattern, such that a shifted coordinate of the first duplicated pattern is identical to a shifted coordinate of the second duplicated pattern; performing a computer-generated hologram (CGH) algorithm according to the first content image, the first off-axis shift, the second content image, the second off-axis shift, a wavelength of the light beam, and a first reconstructive distance to generate a phase image; and driving the liquid crystal on silicon panel according to the phase image such that the liquid crystal on silicon panel receives the light beam and displays a first reconstructive image at the first reconstructive distance.

In some embodiments, the first off-axis shift is in a first direction. The projection method further includes: progressively increasing an intensity of the first duplicated pattern along the first direction.

In some embodiments, the second off-axis shift is in a second direction. The projection method further includes: progressively increasing an intensity of the second duplicated pattern along the second direction.

In some embodiments, the target pattern is at a first coordinate in a range corresponding to the liquid crystal on silicon panel. The projection method further includes: setting the first off-axis shift, such that the shifted coordinate of the first duplicated pattern is different from the first coordinate and outside the range corresponding to the liquid crystal on silicon panel.

In some embodiments, the liquid crystal on silicon panel includes multiple pixels. The projection method further includes: determining an upper limit of the first off-axis shift according to the first reconstructive distance, the wavelength and a size of the pixels.

In some embodiments, the target image further includes a second target pattern. The projection method further includes: generating a third content image and a fourth content image according to the target image, in which the third content image includes a third duplicated pattern of the second target pattern, the fourth content image includes a fourth duplicated pattern of the second target pattern, a coordinate of the third duplicated pattern is different from a coordinate of the fourth duplicated pattern; setting a third off-axis shift of the third duplicated pattern and a fourth off-axis shift of the fourth duplicated pattern, such that a shifted coordinate of the third duplicated pattern is identical to a shifted coordinate of the fourth duplicated pattern; and performing the CGH algorithm according to a second reconstructive distance, such that the liquid crystal on silicon panel displays a second reconstructive image corresponding to the second target pattern at the second reconstructive distance.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
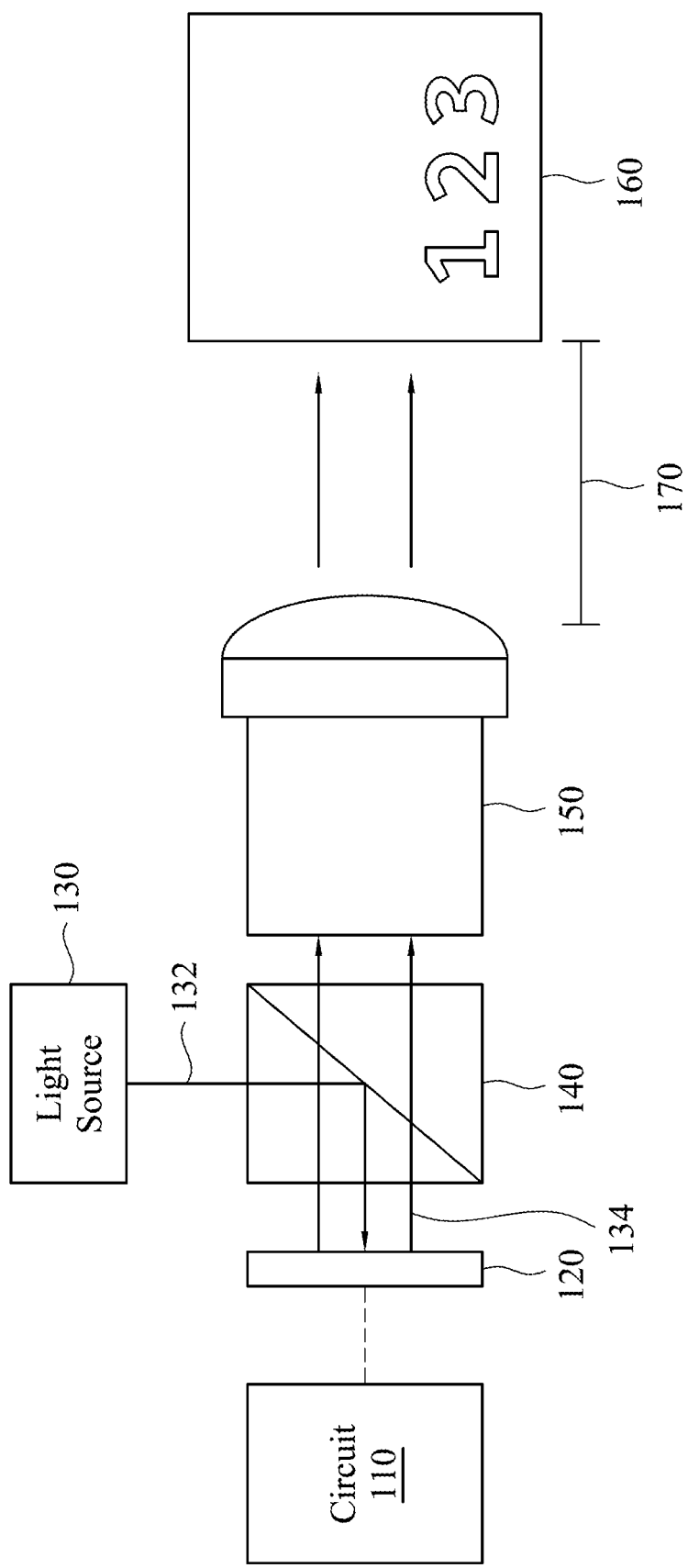
FIG. 1 is a schematic diagram of a projection device in accordance with an embodiment.

FIG. 1 is a schematic diagram of a projection device in accordance with an embodiment. Referring to FIG. 1, the projection device includes a circuit 110, a liquid crystal on silicon (LCoS) panel 120, a light source 130, a beam splitter device 140 and a projection lens 150. The circuit 110 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). The light source 130 is, for example, a laser source to emit a light beam 132 to the beam splitter device 140. The beam splitter device 140 is, for example, a polarizing beam splitters (PBS) to reflect the light beam 132 having a first polarization to the LCoS panel 120. The LCoS panel 120 includes multiple pixels, and each pixel is configured to change a phase of the light beam 132. The circuit 110 drives the LCoS panel 120 according to a phase image to convert the light beam 132 into an image beam 134. The beam splitter device 140 receives the image beam 134 and transmits the image beam 134 having a second polarization to the projection lens 150. For example, the first polarization is S-polarization and the second polarization is P-polarization, but the disclosure is not limited thereto. The phase image is also referred to a kinoform image. The projection lens 150 includes, for example, a collimator and one or more lens. The image beam 150 outputted from the projection lens 150 can form a reconstructive image 160 which may be projected onto a screen, human eyes, transparent material, or any suitable material at a reconstructive distance 170 which is not limited in the disclosure.

When a target image is to be displayed in the embodiment, the circuit 110 duplicates patterns of the target image to generate multiple content images. These duplicated patterns will overlap with each other by off-axis means. Therefore, speckles noises of the reconstructive image 160 are reduced. The operation of the circuit 110 will be described in detail below.

Figure 2:
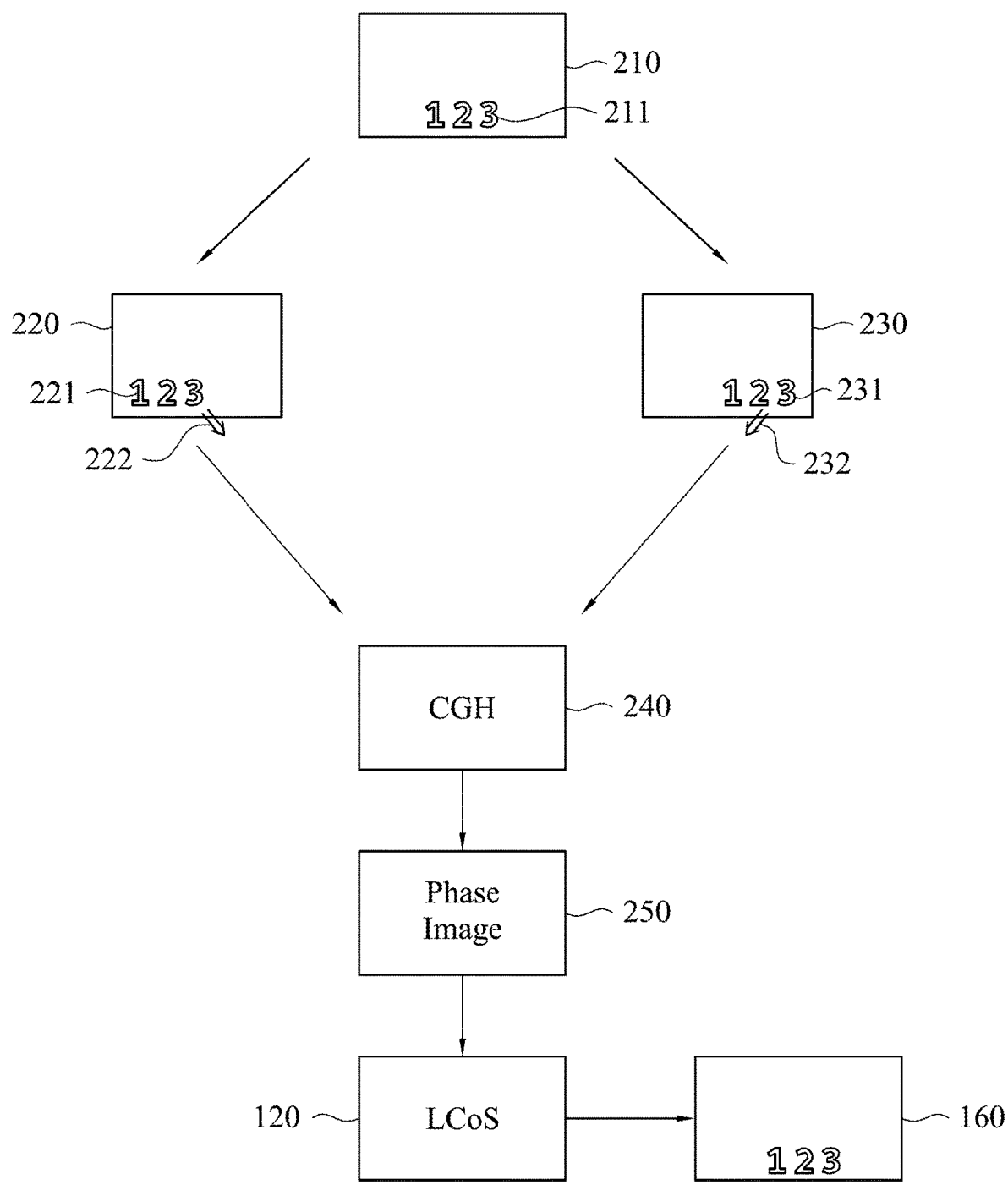
FIG. 2 is a schematic diagram of generation of a reconstructive image in accordance with an embodiment.

FIG. 2 is a schematic diagram of generation of a reconstructive image in accordance with an embodiment. Referring to FIG. 2, a target image 210 is obtained. The target image 210 includes a target pattern 211 which may be numbers, texts, symbols, pictures and combination thereof, which is not limited in the disclosure. Next, a first content image 220 and a second content image 230 are generated according to the target image 210. The first content image 220 includes a duplicated pattern 221 of the target pattern 211. That is, the shapes and colors of the duplicated pattern 221 are the same as that of the target pattern 211. Similarly, the second content image 230 includes a duplicated pattern 231 of the target pattern 211. In particular, a coordinate of the duplicated pattern 221 is different from a coordinate of the duplicated pattern 231. In the embodiment, the target pattern 211 is moved toward left to generate the duplicated pattern 221, and the target pattern 211 is moved toward right to generate the duplicated pattern 231.

An off-axis shift 222 of the duplicated pattern 221 is set, and an off-axis shift 232 of the duplicated pattern 231 is set, such that a shifted coordinate of the duplicated pattern 221 is identical to a shifted coordinate of the duplicated pattern 231. For example, the coordinate of the target pattern 211 is (x,y), the coordinate of the duplicated pattern 221 is (x−a,y), and the coordinate of the duplicated pattern 231 is (x+a,y). The off-axis shift 222 is (+a, −b), and therefore the shifted coordinate of the duplicated pattern 221 is (x,y−b). The off-axis shift 232 is (−a, −b), and therefore the shifted coordinate of the duplicated pattern 231 is (x,y−b) where x, y, a, and b are real numbers. Note that the shifted coordinate (x,y−b) of the duplicated pattern 221 is different from the coordinate (x,y) of the target pattern 211. In some embodiments, the coordinate (x,y) is in a range corresponding to the LCoS panel 120, but the shifted coordinate (x,y−b) of the duplicated pattern 221 is outside the range of the LCoS panel 120. For example, (y−b)<0 means the y coordinate is outside the range of the LCoS panel 120. This is because there are some uncontrollable optical effects between the pixels that will affect the image in the range of the panel. Accordingly, it is set that the shifted coordinate is outside of the range of the panel.

Next, a computer-generated hologram (CGH) algorithm 240 is performed according to the first content image 220, the off-axis shift 222, the second content image 230, the off-axis shift 232, the wavelength of the light beam 132, and the reconstructive distance 170 to generate a phase image 250. The CHG algorithm 240 can calculate the value of each pixel of the phase image 250 according to the principles of constructive and destructive interference. Any suitable CGH algorithm may be adopted herein which is not limited in the disclosure. The pixels of the phase image 250 correspond to the pixels of the LCoS panel 120 respectively to change the phase of the light beam passing through the corresponding pixel. The LCoS panel 120 is driven according to the phase image 250 to display the reconstructive image 160.

Figure 3:
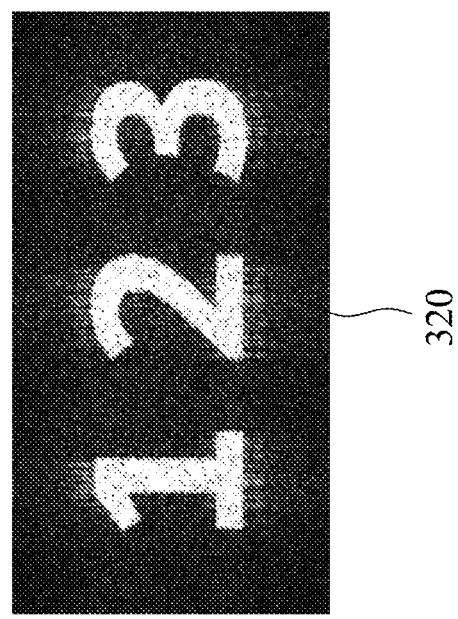
FIG. 3 is a diagram illustrating the reconstructive image in accordance with an embodiment.
Figure 3:
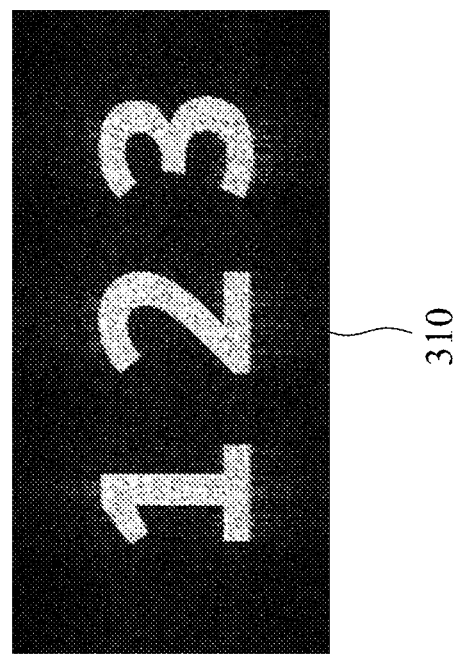

The reconstructive image 160 may have speckles (e.g. bright speckles or dark speckles). In the embodiment, the duplicated pattern 221 and the duplicated pattern 231 overlap with each through the off-axis means, and thus the speckle noises in the reconstructive image 160 are reduced. FIG. 3 is a diagram illustrating the reconstructive image in accordance with an embodiment. Referring to FIG. 3, a reconstructive image 310 is generated according to a conventional method, and that is, the corresponding phase image is generated directly according to the target image 210. On the other hand, the reconstructive image 320 is generated according to the method of the embodiment. It is shown in FIG. 3 that the speckles noises in the reconstructive image 320 are reduced compared to the reconstructive image 310. The extent of the noise reduction can be estimated by the standard deviation of the intensities of the pixels. In the example, the standard deviation of the reconstructive image 310 is 0.2, and the standard deviation of the reconstructive image 320 is 0.15.

Figure 4:
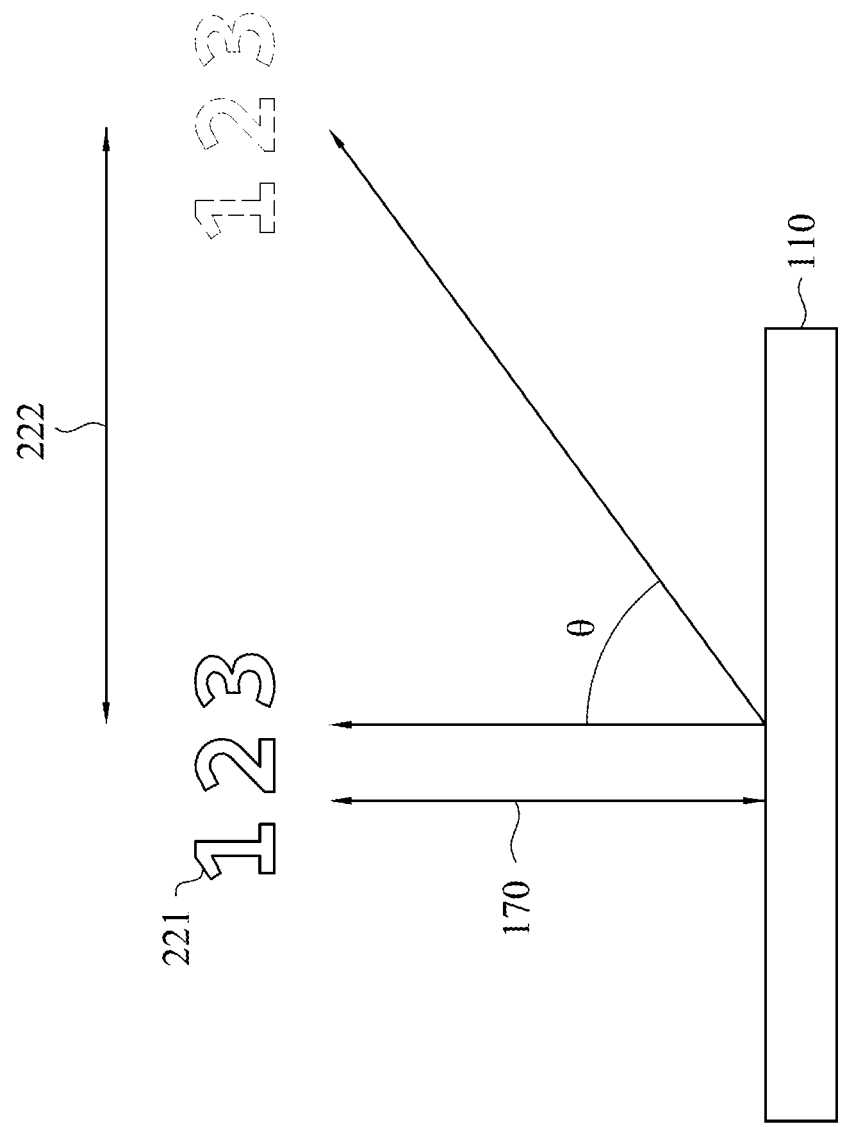
FIG. 4 is a diagram illustrating the off-axis shift in accordance with an embodiment.

FIG. 4 is a diagram illustrating the off-axis shift in accordance with an embodiment. Referring to FIG. 4, take the duplicated pattern 221 as an example, the corresponding off-axis shift 222 has an upper limit determined by an off-axis angle θ and the reconstructive distance 170. The angle θ is limited to the size of the pixels and the wavelength of the light beam. In some embodiments, the upper limit of the off-axis shift 222 is determined according to the reconstructive distance 170, the wavelength of the light beam and the sizes of the pixels. For example, when the wavelength is 520 nm and the size of the pixels is 4.25 micro meters, the maximum value of the angle θ is 7 degrees. Therefore, the upper limit is d×sin θ where d is the reconstructive distance 170.

In addition, when the duplicated pattern 221 is off-axis shifted, the farer the pixel is, the more the intensity thereof is reduced. In the embodiment, the intensity of the pixels is compensated according to the shifted distance. For example, if the off-axis shift 222 is in a first direction, then the intensities of the duplicated pattern 221 is progressively increased along the first direction, for example, by a linear function. In the example, the intensity of the number "3" will be compensated more than that of the number "1". Similarly, if the off-axis shift 232 of the duplicated pattern 231 is in a second direction, then the intensities of the duplicated pattern 232 are progressively increased along the second direction.

Figure 5:
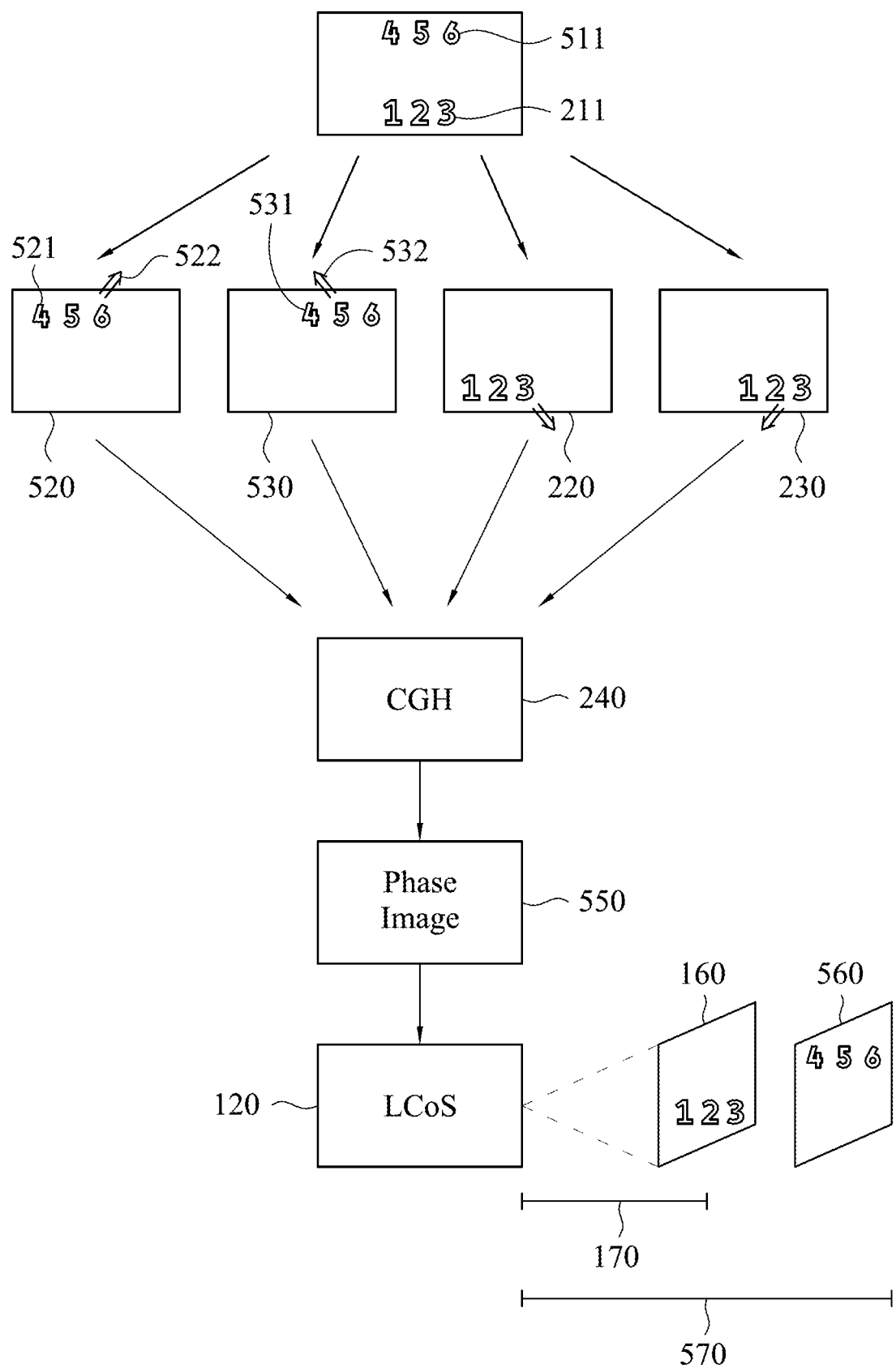
FIG. 5 is a schematic diagram of generation of two reconstructive images in accordance with an embodiment.

In some embodiments, if the target image has more than one target patterns, then images may be reconstructed at different distances. In the embodiment of FIG. 5, the target image 210 further includes a target pattern 511. The circuit 110 also generates a third content image 520 and a fourth content image 530. The third content image 520 includes a duplicated pattern 521 of the target pattern 511. The fourth content image 530 includes a duplicated pattern 531 of the target pattern 511. The coordinate of the duplicated pattern 521 is different from that of the duplicated pattern 531. The circuit 110 sets an off-axis shift 522 of the duplicated pattern 521 and an off-axis shift 532 of the duplicated pattern 531, such that the shifted coordinate of the duplicated pattern 521 is identical to the shifted coordinate of the pattern 531. The CGH algorithm is performed further according to the content images 520 and 530 in which a reconstructive distance 570 is additionally set, such that the reconstructive image 160 is formed at the reconstructive distance 170, and a reconstructive image 560 corresponding to the target pattern 511 is formed at the reconstructive distance 570. The reconstructive distance 170 is different from the reconstructive distance 570. For example, the reconstructive distance 170 is 5 meters (m), and the reconstructive distance 570 is 10 m. As a result, the user can see two target patterns at different depth of the field.

The aforementioned method reduces the speckles by a space division way. In some embodiment, the space division may be combined with time division. For example, when there is only one LCoS panel 120, images of red, green and blue are rendered by time division, and these three images may be further processed by the aforementioned space division method to reduce the speckle noises. Alternatively, when there are three LCoS panels 120 rendering images of red, green, and blue respectively, the image of each panel may also be processed by the space division method.

Figure 6:
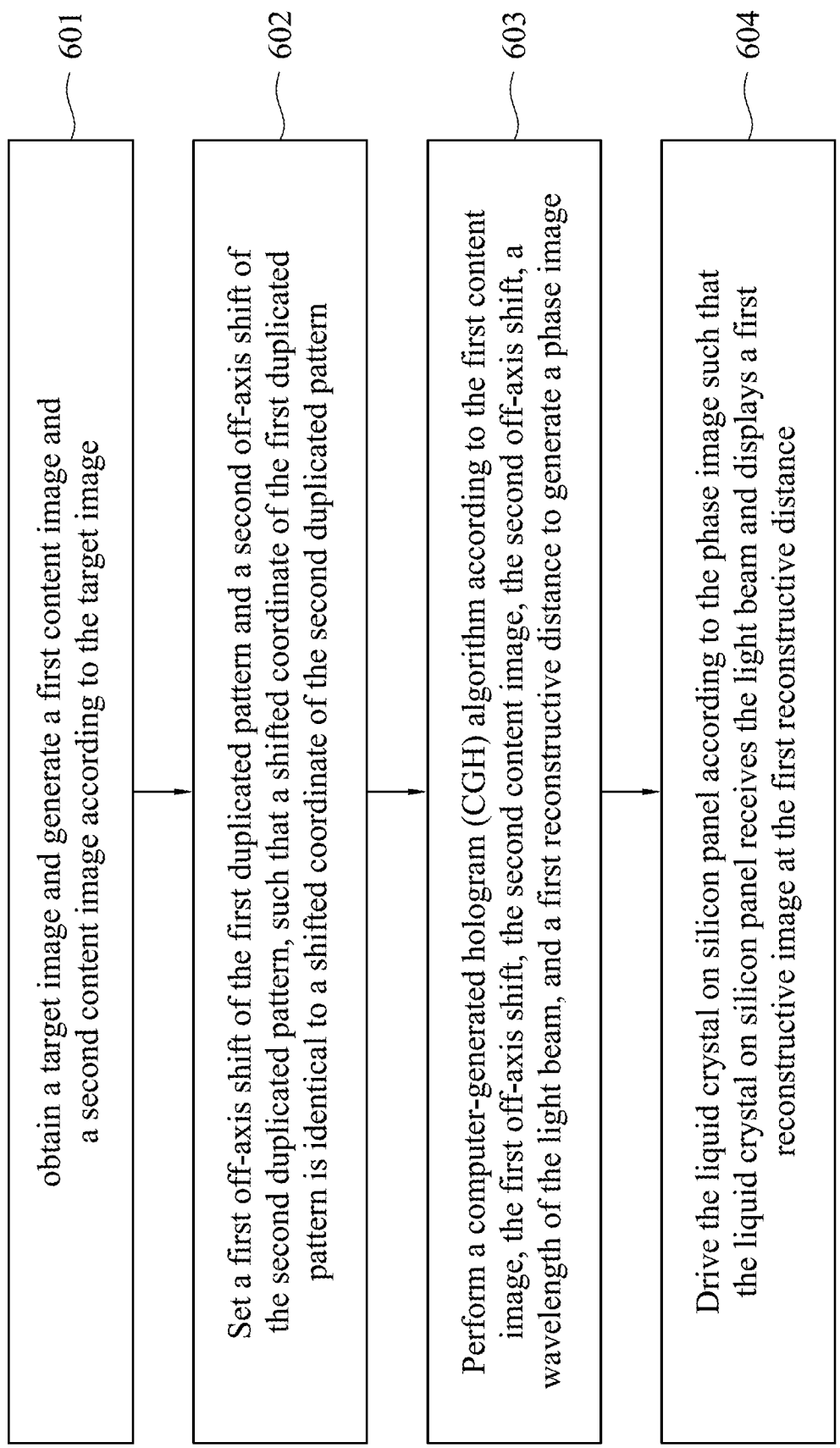
FIG. 6 is a flow chart of a projection method in accordance with an embodiment.

FIG. 6 is a flow chart of a projection method in accordance with an embodiment. Referring to FIG. 6, in step 601, a target image is obtained, and a first content image and a second content image are generated according to the target image. The target image includes a first target pattern, the first content image includes a first duplicated pattern of the first target pattern, and the second content image includes a second duplicated pattern of the first target pattern. The coordinate of the first duplicated pattern is different from that of the second duplicated pattern. In step 602, a first off-axis shift of the first duplicated pattern and a second off-axis shift of the second duplicated pattern are set, such that a shifted coordinate of the first duplicated pattern is identical to a shifted coordinate of the second duplicated pattern. In step 603, a computer-generated hologram (CGH) algorithm is performed according to the first content image, the first off-axis shift, the second content image, the second off-axis shift, a wavelength of the light beam, and a first reconstructive distance to generate a phase image. In step 604, the liquid crystal on silicon panel is driven according to the phase image such that the liquid crystal on silicon panel receives the light beam and displays a first reconstructive image at the first reconstructive distance. However, all the steps in FIG. 6 have been described in detail above, and therefore the description will not be repeated. Note that the steps in FIG. 6 can be implemented as program codes or circuits, and the disclosure is not limited thereto. In addition, the method in FIG. 6 can be performed with the aforementioned embodiments, or can be performed independently. In other words, other steps may be inserted between the steps of the FIG. 6.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A projection device, comprising:
a light source configured to provide a light beam;
a liquid crystal on silicon (LCoS) panel; and
a circuit configured to obtain a target image comprising a first target pattern, and generate a first content image and a second content image according to the target image, wherein the first content image comprises a first duplicated pattern of the first target pattern, the second content image comprises a second duplicated pattern of the first target pattern, and a coordinate of the first duplicated pattern is different from a coordinate of the second duplicated pattern,
wherein the circuit is configured to set a first off-axis shift of the first duplicated pattern and a second off-axis shift of the second duplicated pattern, such that a shifted coordinate of the first duplicated pattern is identical to a shifted coordinate of the second duplicated pattern,
wherein the circuit is configured to perform a computer-generated hologram (CGH) algorithm according to the first content image, the first off-axis shift, the second content image, the second off-axis shift, a wavelength of the light beam, and a first reconstructive distance to generate a phase image,
wherein the liquid crystal on silicon panel is configured to receive the light beam, the circuit is configured to drive the liquid crystal on silicon panel according to the phase image to display a first reconstructive image at the first reconstructive distance.

2. The projection device of claim 1, wherein the first off-axis shift is in a first direction, and the circuit is configured to progressively increase an intensity of the first duplicated pattern along the first direction.

3. The projection device of claim 2, wherein the second off-axis shift is in a second direction, the circuit is configured to progressively increase an intensity of the second duplicated pattern along the second direction.

4. The projection device of claim 2, wherein the target pattern is at a first coordinate in a range corresponding to the liquid crystal on silicon panel, the circuit is configured to set the first off-axis shift, such that the shifted coordinate of the first duplicated pattern is different from the first coordinate and outside the range corresponding to the liquid crystal on silicon panel.

5. The projection device of claim 1, wherein the liquid crystal on silicon panel comprises a plurality of pixels, the circuit is configured to determine an upper limit of the first off-axis shift according to the first reconstructive distance, the wavelength and a size of the pixels.

6. The projection device of claim 1, wherein the target image further comprises a second target pattern, the circuit is configured to generate a third content image and a fourth content image according to the target image, wherein the third content image comprises a third duplicated pattern of the second target pattern, the fourth content image comprises a fourth duplicated pattern of the second target pattern, a coordinate of the third duplicated pattern is different from a coordinate of the fourth duplicated pattern,
wherein the circuit is configured to set a third off-axis shift of the third duplicated pattern and a fourth off-axis shift of the fourth duplicated pattern, such that a shifted coordinate of the third duplicated pattern is identical to a shifted coordinate of the fourth duplicated pattern,
wherein the circuit is further configured to perform the CGH algorithm according to a second reconstructive distance, such that the liquid crystal on silicon panel displays a second reconstructive image corresponding to the second target pattern at the second reconstructive distance.

7. A projection method for a liquid crystal on silicon panel, the projection method comprising:
obtaining a target image and generating a first content image and a second content image according to the target image, wherein the target image comprises a first target pattern, the first content image comprises a first duplicated pattern of the first target pattern, the second content image comprises a second duplicated pattern of the first target pattern, and a coordinate of the first duplicated pattern is different from a coordinate of the second duplicated pattern;
setting a first off-axis shift of the first duplicated pattern and a second off-axis shift of the second duplicated pattern, such that a shifted coordinate of the first duplicated pattern is identical to a shifted coordinate of the second duplicated pattern;
performing a computer-generated hologram (CGH) algorithm according to the first content image, the first off-axis shift, the second content image, the second off-axis shift, a wavelength of the light beam, and a first reconstructive distance to generate a phase image; and
driving the liquid crystal on silicon panel according to the phase image such that the liquid crystal on silicon panel receives the light beam and displays a first reconstructive image at the first reconstructive distance.

8. The projection method of claim 7, wherein the first off-axis shift is in a first direction, the projection method further comprises:
progressively increasing an intensity of the first duplicated pattern along the first direction.

9. The projection method of claim 8, wherein the second off-axis shift is in a second direction, the projection method further comprises:
progressively increasing an intensity of the second duplicated pattern along the second direction.

10. The projection method of claim 8, wherein the target pattern is at a first coordinate in a range corresponding to the liquid crystal on silicon panel, the projection method further comprises:
setting the first off-axis shift, such that the shifted coordinate of the first duplicated pattern is different from the first coordinate and outside the range corresponding to the liquid crystal on silicon panel.

11. The projection method of claim 7, wherein the liquid crystal on silicon panel comprises a plurality of pixels, the projection method further comprises:
determining an upper limit of the first off-axis shift according to the first reconstructive distance, the wavelength and a size of the pixels.

12. The projection method of claim 7, wherein the target image further comprises a second target pattern, the projection method further comprises:
generating a third content image and a fourth content image according to the target image, wherein the third content image comprises a third duplicated pattern of the second target pattern, the fourth content image comprises a fourth duplicated pattern of the second target pattern, a coordinate of the third duplicated pattern is different from a coordinate of the fourth duplicated pattern;

setting a third off-axis shift of the third duplicated pattern and a fourth off-axis shift of the fourth duplicated pattern, such that a shifted coordinate of the third duplicated pattern is identical to a shifted coordinate of the fourth duplicated pattern; and performing the CGH algorithm according to a second reconstructive distance, such that the liquid crystal on silicon panel displays a second reconstructive image corresponding to the second target pattern at the second reconstructive distance.

\* \* \* \* \*